US010343270B2

(12) United States Patent
Dombek (10) Patent No.: US 10,343,270 B2
(45) Date of Patent: Jul. 9, 2019

(54) DEVICE AND METHOD FOR HOOP REINFORCING OF RESTRICTORS IN STANDBY SYSTEMS OF A JOURNAL BEARING

(71) Applicant: SAFRAN TRANSMISSION SYSTEMS, Colombes (FR)

(72) Inventor: Alexis Dombek, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 0 days.

(21) Appl. No.: 15/771,382

(22) PCT Filed: Oct. 25, 2016

(86) PCT No.: PCT/FR2016/052775
§ 371 (c)(1),
(2) Date: Apr. 26, 2018

(87) PCT Pub. No.: WO2017/072441
PCT Pub. Date: May 4, 2017

(65) Prior Publication Data
US 2018/0326566 A1    Nov. 15, 2018

(30) Foreign Application Priority Data

Oct. 27, 2015 (FR) ..................... 15 60244

(51) Int. Cl.
*F16C 32/06* (2006.01)
*B25B 27/04* (2006.01)
(Continued)

(52) U.S. Cl.
CPC .............. *B25B 27/04* (2013.01); *B25B 5/103* (2013.01); *B25B 5/147* (2013.01); *F16C 17/20* (2013.01);
(Continued)

(58) Field of Classification Search
CPC ......... B25B 5/103; B25B 5/147; B25B 27/02; B25B 27/04; F16C 17/02; F16C 17/20;
(Continued)

(56) References Cited

U.S. PATENT DOCUMENTS

| 3,863,996 A * | 2/1975 | Raimondi ............. F01D 25/164 384/108 |
| 3,997,961 A | 12/1976 | Sandrick |
| 6,116,118 A * | 9/2000 | Wesch, Jr. ............ E21B 19/161 81/57.16 |
| 9,765,817 B1 * | 9/2017 | Chen ................... F16C 33/1045 |

(Continued)

FOREIGN PATENT DOCUMENTS

| DE | 10015074 C1 | 8/2001 |
| DE | 102011008810 A1 | 7/2012 |
| FR | 2963269 A1 | 2/2012 |

OTHER PUBLICATIONS

Preliminary Research Report received for French Application No. 1560244, dated Sep. 12, 2016, 4 pages (1 page of French Translation Cover Sheet and 3 pages of original document).
(Continued)

*Primary Examiner* — Phillip A Johnson
(74) *Attorney, Agent, or Firm* — Womble Bond Dickinson (US) LLP (57) ABSTRACT

The invention concerns a device (1) for hoop reinforcing of restrictors inside at least two hydraulic supply standby systems of a journal bearing. Said device is remarkable in that it comprises: a frame (2) for receiving said hearing, a syringe (3) for introducing said restrictors and a torque pick-off spindle (4), and in that said frame (2) comprises: a cradle (21), a guide plate (23) pierced with two guide openings (231), inclined at the same angle as those of said backup systems of the bearing, so as to be located in the extension of same when the bearing is in the frame, said guide openings (231) being shaped to receive said syringe (3) or said torque pick-off spindle (4).

11 Claims, 6 Drawing Sheets

(51) Int. Cl.
  *B25B 5/10* (2006.01)
  *B25B 5/14* (2006.01)
  *F16C 43/02* (2006.01)
  *F16C 17/20* (2006.01)
  *F16C 33/10* (2006.01)
  *F16C 39/02* (2006.01)
  *F16C 17/02* (2006.01)
  *F16C 33/14* (2006.01)

(52) U.S. Cl.
  CPC ............ *F16C 33/105* (2013.01); *F16C 43/02* (2013.01); *F16C 17/02* (2013.01); *F16C 32/0622* (2013.01); *F16C 33/14* (2013.01); *F16C 39/02* (2013.01)

(58) Field of Classification Search
  CPC .... F16C 33/105; F16C 33/1055; F16C 43/02; Y10T 29/49639
  See application file for complete search history.

(56) References Cited

U.S. PATENT DOCUMENTS

2005/0050721 A1    3/2005  Etling
2005/0057690 A1*   3/2005  Choi .................. G09G 5/18
                                                      348/547
2011/0162186 A1    7/2011  Chapin et al.

OTHER PUBLICATIONS

International Search Report and Written Opinion received for PCT Patent Application No. PCT/FR2016/052775, dated Jan. 12, 2017, 19 pages (9 pages of English Translation and 10 pages of Original Document).

International Preliminary Report on Patentability received for PCT Patent Application No. PCT/FR2016/052775, dated May 11, 2018, 15 pages (8 pages of English Translation and 7 pages of Original Document).

* cited by examiner

FIG. 8

DEVICE AND METHOD FOR HOOP REINFORCING OF RESTRICTORS IN STANDBY SYSTEMS OF A JOURNAL BEARING

GENERAL TECHNICAL FIELD

The invention is situated in the field of journal bearings.

The present invention relates more precisely to a hoop reinforcing device for restrictors inside hydraulic supply standby systems (or circuits) of a journal bearing.

The invention also relates to a hoop reinforcing method for these restrictors using the aforementioned device.

PRIOR ART

A journal bearing is a guiding device for guiding in rotation by sliding. It has a generally cylindrical shape and is received in the cylindrical bore of a casing.

In certain embodiments, the bearing is lubricated using a film of oil injected under pressure from the interior of the bearing, in the direction of its outer surface which constitutes the surface situated facing the casing bore.

In the event of a failure of the lubrication pump or obstruction of the duct supplying oil to the outer surface of the bearing, the bearing risks seizing.

In order to avoid this, the bearing is equipped with at least two hydraulic supply standby systems, each joining the interior face of the bearing to its exterior face. These standby systems allow the outer surface of the bearing to continue to be supplied with oil for a given period, depending on the specifications. Such a journal bearing is for example used in aeronautics, although this application is not limiting.

In order to be able to distribute the oil during the aforementioned predetermined period, the flow rate of oil should be limited inside each standby system, thereby creating a head loss inside each of these systems. To this end, flow rate restrictors are mounted in each standby system.

Figure 1:
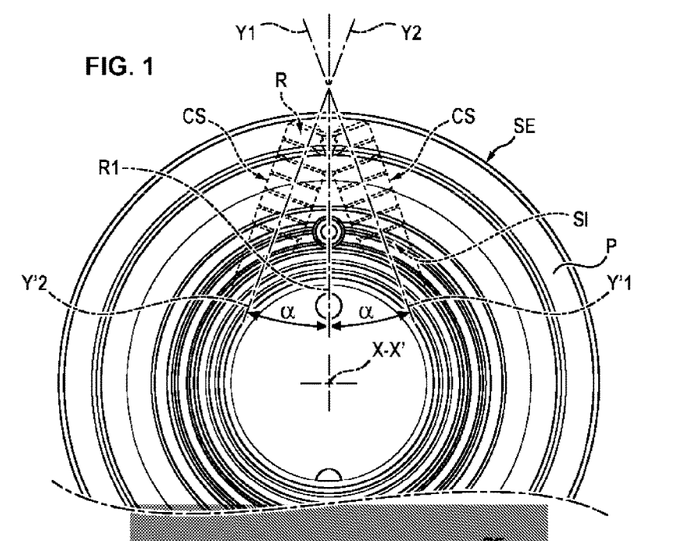
FIG. 1 is an end view of a portion of a journal bearing having two hydraulic supply standby systems equipped with restrictors.
Figure 2:
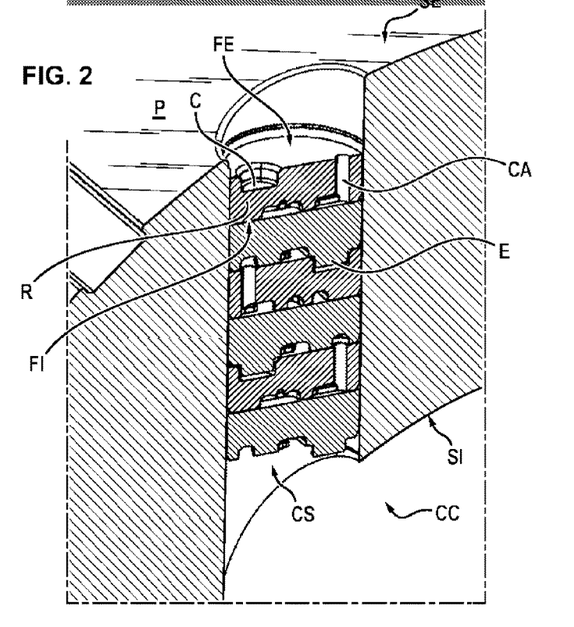
FIG. 2 is a detail and section view of a standby system and of restrictors.

As can be seen in the appended FIG. 1, which represents a portion of a bearing P, each standby system CS is a cylindrical bore which connects the exterior cylindrical surface SE of the bearing to its cylindrical interior surface SI (see also the appended FIG. 2 which represents this standby system).

The standby systems CS do not extend radially in this bearing P. Consequently, their longitudinal axes Y1-Y'1, respectively Y2-Y'2, do not pass through the center of the bearing P, materialized by its longitudinal axis X-X'. The two longitudinal axes Y1-Y'1 respectively Y2-Y'2, preferably extend in a plane perpendicular to the axis X-X'. Also preferably, they each form an angle a on either side of a radius R1 of the bearing P, the two angles a being identical.

In addition, the two standby systems CS lead to the outer surface SE of the cylindrical bearing P, while being spaced along a generatrix of this bearing (parallel to the longitudinal axis X-X').

As can be seen in FIG. 2, each flow rate restrictor R is a cylinder which comprises a channel CA in the shape of a chicane connecting the two opposite circular faces of the cylindrical restrictor, namely its exterior face FE and its interior face FI.

In addition, each restrictor R comprises on its two end faces a telltale. This telltale is for example a male element or spur E, protruding for example from its interior face FI, and capable of cooperating with a female element or cavity C, formed for example on its exterior face FE.

The different restrictors R, (numbering six for example in FIG. 2), are stacked on top of one another. The telltales E and C allow the respective angular orientation of the different restrictors R to be respected, so as to put their channels CA into fluid communication.

Once these restrictors are stacked, they must then be hoop reinforced (shrink fit) all together inside the standby system CS.

Moreover, provision is made to dismantle these restrictors R by pushing them toward the interior of the central cavity CC of the bearing P. For this reason, no abutment is provided in the bottom of the standby system CS. It is nevertheless necessary to control the axial dimension of the positioning of the stack of restrictors R, inside the standby system.

Document U.S. Pat. No. 3,863,996 describes a bearing having a restrictor but does not describe any device for assembling it.

Already know from document US 2005/0050721 is a hoop reinforcing device used to hoop reinforce (press) a shaft in a disk. However, this document does not describe a device conforming to the claimed invention.

Finally, document FR 2 963 269 describes a device for extraction and insertion of a pin in a part, but independently of any frame for retaining said part.

PRESENTATION OF THE INVENTION

The invention therefore has as its aim to propose a hoop reinforcing device for restrictors inside hydraulic supply standby systems of a journal bearing, which allows:

- ensuring the retention of the different restrictors stacked together to guarantee their angular orientation,
- ensuring the descent of the restrictors into the bore constituting the standby system,
- guaranteeing the final axial positioning of the stack of restrictors inside the standby system,
- taking up the torque generated by the force for press-fitting the restrictors, taking into account the fact that the standby system does not pass through the center of the bearing,
- mounting restrictors in both standby systems.

To this end, the invention relates to a hoop reinforcing device for restrictors inside at least two hydraulic supply standby systems of a journal bearing.

In conformity with the invention, this device comprises:
- a frame for receiving said journal bearing,
- a syringe for introducing restrictors and
- a torque pickoff spindle, said frame comprises:
- a cradle
- a guide plate perforated with at least two guide openings, inclined at the same angle as those of said standby systems of the bearing, so as to be located in the continuation of the latter when the bearing is in the frame, these guide openings being formed to receive said syringe or said torque pickoff spindle.

Thanks to these features of the invention, it is possible to use a single identical device to insert the restrictors into the two differently oriented standby systems. It is not necessary to disassemble the bearing between these two introduction operations. In addition, such a device allows taking up the torque generated by the force for press-fitting the restrictors.

According to other advantageous and non-limiting features of the invention, taken alone or in combination:

said frame comprises a cradle for receiving said journal bearing, at least one flange for retaining said bearing, capable of occupying a position called "passive" in which it is separated from the cradle and allows the introduction of the bearing into the latter, and a position called "active" in which it cooperates with the cradle to immobilize said bearing in the cradle, means for locking said flange in the active position, and said guide plate is integral with said at least one flange, said flange is pivotally mounted with respect to the cradle around a pivoting axis disposed at one of its ends, and it has at its opposite end means of cooperation with said means for locking the flange in the active position, said locking means are a threaded rod pivotally mounted at its base with respect to the cradle and a nut and the cooperation means provided on the flange are an opening for receiving the free end of said threaded rod, the device comprises two flanges connected together by said guide plate, the longitudinal axes of the guide openings are not crossing with the longitudinal axis of the frame:

the longitudinal axes of the guide openings extend in a vertical plane perpendicular to the longitudinal axis of the frame and form an identical angle on either side of a longitudinal vertical plane which includes the longitudinal axis of the frame, the two guide openings are spaced longitudinally by a distance corresponding to that existing between the outlet openings of the standby systems at the outer surface of said journal bearing, said syringe for introducing the restrictors comprises a syringe body, perforated with a cylindrical bore for receiving said restrictors, a push-piece configured to be able to be inserted into the body and push the restrictors out of the latter and a cylindrical slide of which the outer wall is provided with an O-ring seal, this slide being configured to be able to be inserted into the syringe body downstream of the restrictors and slow their movement in the syringe body, said torque pickoff spindle is a cylinder comprising several stepped portions with different diameters, including at least one end zone of which the outer diameter corresponds, within the sliding clearance, to the inner diameter of the standby system of the bearing intended to be equipped with restrictors, an intermediate zone of which the outer diameter corresponds, within the sliding clearance, to the inner diameter of the guide opening and a zone contiguous with the preceding one of which the outer diameter is greater than the inner diameter of the guide opening.

Finally, the invention also relates to a method for hoop reinforcing restrictors inside hydraulic supply standby systems of a journal bearing, which uses the aforementioned device.

This method comprises the following steps of:

heating the journal bearing, introducing it into the receiving frame of the aforementioned hoop reinforcement device, orienting the bearing so that the outlet mouths of its standby systems are facing the guide openings of the guide plate, introducing the torque pickoff spindle into one of said guide openings, called the "first guide opening" and into the standby system situated facing it, introducing the syringe containing the restrictors into the other guide opening, called the "second guide opening" and into the standby system situated facing it, and acting on the syringe to hoop reinforce said restrictors inside said standby system, removing the syringe and the spindle from said guide openings, introducing the torque pickoff spindle into the second guide opening and into the upper portion of the standby system situated facing it, introducing the syringe containing the restrictors into the first guide opening and into the standby system situated facing it and acting on the syringe to hoop reinforce said restrictors inside said standby system, removing the syringe and the spindle from said guide openings.

PRESENTATION OF THE FIGURES

Other features and advantages of the invention will appear from the description which will now be made of it, with reference to the appended drawings, which represent, by way of indication but without limitation, one possible embodiment.

In these drawings.

DETAILED DESCRIPTION

Figure 5:
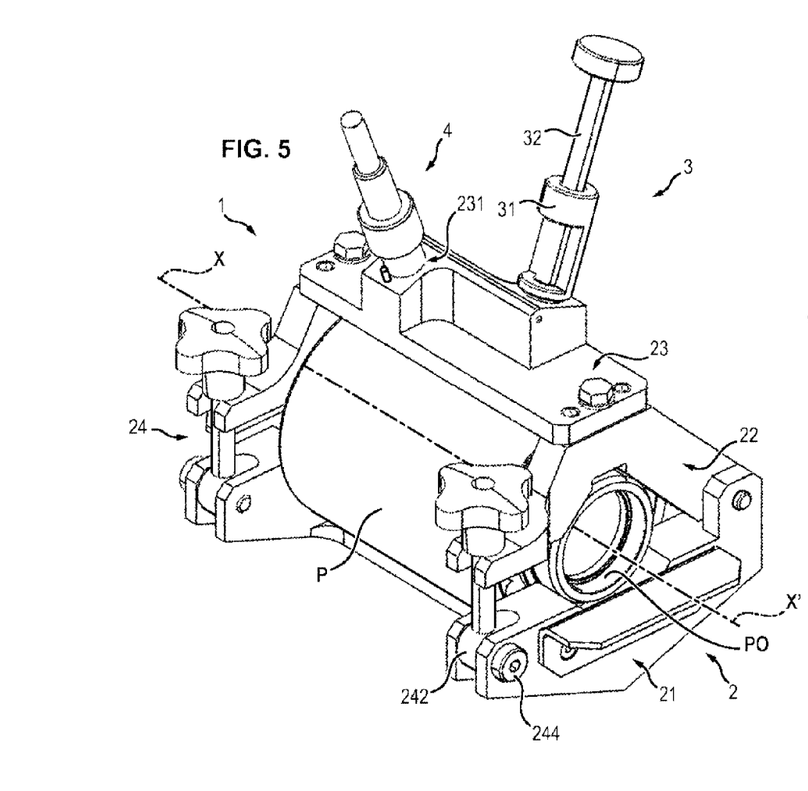
FIG. 5 is a view similar to FIG. 4, in which are further represented the syringe for introducing the restrictors and the torque pickoff spindle of the hoop reinforcing device conforming to the invention.

Generally, and as can be seen in FIG. 5, the hoop reinforcing device 1 of the restrictors conforming to the invention comprises a frame 2 which is designed to receive the bearing P, a syringe 3 for introducing the restrictors into the interior of said bearing and a torque pickoff spindle 4.

These different elements will now be described in more detail.

Referring back to FIGS. 3 and 4, an embodiment of the frame 2 can be seen.

Figure 3:
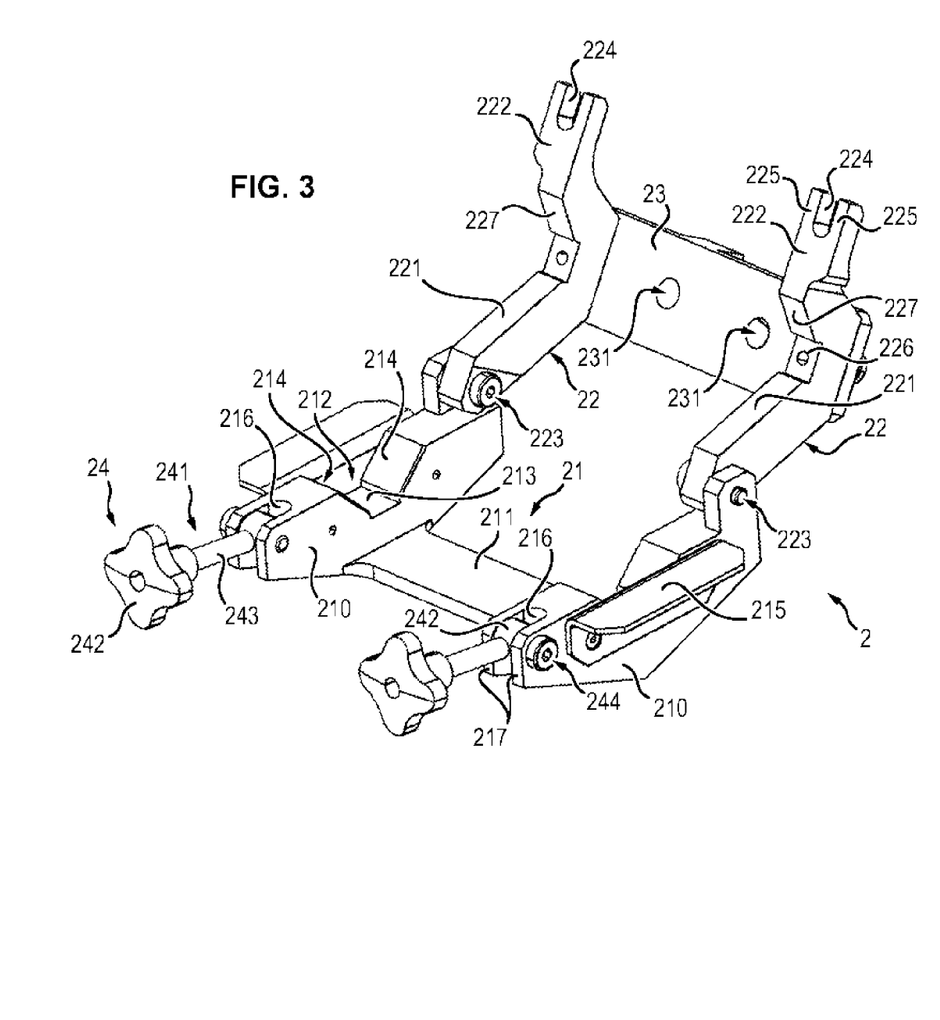
FIG. 3 is a perspective view of the frame of the hoop reinforcing device conforming to the invention, shown in the open position.
Figure 4:
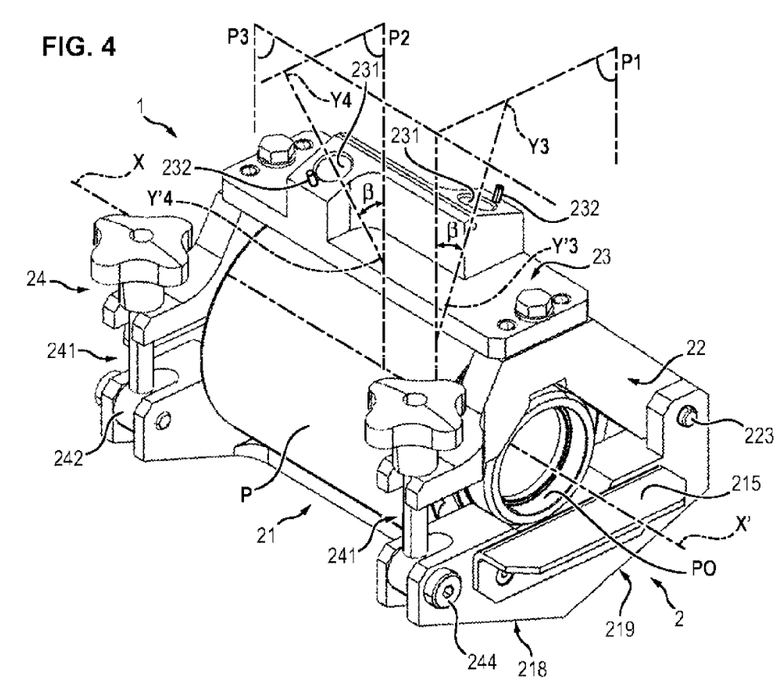
FIG. 4 is a perspective view of the same frame, in the closed position, enclosing a journal bearing.

This frame 2 comprises a guide plate 23 and preferably, a cradle 21, at least one flange 22, preferably two, cooperating with said cradle 21 to block the bearing P and means 24 for locking the flange or the flanges 22 on the cradle 21.

The cradle 21 has a generally curved shape, i.e. it is formed to receive and support the lower portion of the bearing P or more precisely the spans PO situated on each side of the bearing P.

In the exemplary embodiment of the cradle described hereafter, it comprises two parallel cross-members 210, connected together by a central longitudinal stringer 211.

The frame 2 has a central longitudinal axis X-X' which is congruent with the longitudinal axis X-X' of the bearing P, when the latter is mounted in the frame 2.

Each cross-member 210 has a cavity 212 for receiving the bearing or its span PO the concavity of which is turned toward the interior portion of the frame (top of FIG. 3). The cavity 212 has a horizontal planar bottom 213, bordered by two opposite plane walls 214, inclined and widened toward the outside.

Each cross-member 210 is provided with an axial abutment 215 which makes it possible to fix the position of the bearing P along the longitudinal axis X-X' of the frame 2.

These abutments 215 are positioned outside each cross-member 210. Each abutment appears for example in the shape of an L shaped profile of which one vertical leg is attached, screwed for example, to the cross-member 210 and of which the other leg extends horizontally. Each abutment 215 thus blocks a cavity 212.

The two cross-members 210 further have at one of their ends situated on the same side of the frame, an opening 216 leading to the exterior and delimiting two flanges 217.

Each flange 22 has the general shape of a V with two branches 221, 222.

The end of the branch with reference 221 is pivotally mounted with respect to the cradle 2, more precisely with respect to the end of the cross-member 210 opposite to that comprising the flanges 217. This pivoting assembly is carried out around a pivoting axis 223, such as a screw, which extends parallel to the longitudinal axis X-X'.

The point of the V of each flange 22 is truncated, so as to define a planar surface against which is pressed and attached one of the ends of the guide plate 23. The two flanges 22 are thus made integral in their pivoting movement. In the case where there is only a single flange 22 or more than two flanges, the guide plate 23 would be integral with said flange or with at least one of them.

The branch 222 of each flange 22 has an opening 224 leading to the exterior and having on either side two flanges 225.

The interior face of each flange 22 has a generally curved shape of which the concavity is oriented toward the concavity of the cavity 212, when the flanges approach the cradle 21. More precisely, the interior face of the V flange 22 has a planar bottom 226, bordered by two opposite planar walls 227, inclined and widened toward the outside.

The flanges 22 can pivot around their respective axis 223 between a position, called "passive," shown in FIG. 3, in which they are separated from the cradle 21 and allow the installation of the bearing P in this cradle, and a position called "active," shown in FIG. 4, in which they cooperate with the cradle to immobilize the bearing P.

One possible embodiment of the locking means 24 will now be described.

These locking means comprise a T shaped stem 241 and a nut 242, for example a butterfly nut. The horizontal branch 242 of the T of the stem 241 is inserted between the two flanges 217 of the frame 2 and is mounted movable in rotation between these two flanges, around a pivoting axis materialized by a screw 244.

The leg of the T constitutes a stem 243 of which the free end is threaded, so as to be able to cooperate with the nut 242.

When the nuts 242 are unscrewed, and the T shaped stems 241 are separated to the outside, the flanges 22 can be moved in the passive position.

Conversely, when the bearing P is in place, as shown in FIG. 4, the stems 241 are raised so as to be inserted into the opening 224 provided between the flanges 225.

Screwing the nut 242 then allows the two flanges to be held locked to the cradle 21.

As can be seen in FIG. 4, the guide plate 23 is sufficiently thick or has an excess thickness, in which are provided two guide openings 231.

These openings 231 pass through the plate 23 from side to side.

The two guide openings 231 are provided in the plate 23 so that their respective longitudinal axes Y3-Y'3 and Y4-Y'4 are located in the continuation of the longitudinal axes Y2-Y'2, respectively Y1-Y'1, of the standby systems CS of the bearing P when the latter is placed in the frame 2.

In the particular case which corresponds to the bearing P previously described, the longitudinal axes Y3-Y'3 and Y4-Y'4 extend in a vertical plane P1, respectively a vertical plane P2 distinct from P1, perpendicular to the longitudinal axis X-X'. In addition, the axes Y3-Y'3 and Y4-Y'4 do not intersect the longitudinal axis X-X'. Finally, the two longitudinal axes Y3-Y'3 and Y4-Y'4 form an angle B on either side of a longitudinal vertical plane P3 including the axis X-X'. The two angles B are identical and identical to the angle cc described previously.

In addition, advantageously, a telltale 232, such as a protruding spur, is disposed in proximity to each of the guide openings 231.

Advantageously, the base of the cradle 21, more precisely that of the cross-members 210, comprises two planar faces, namely a face 218 perpendicular to the axis Y3-Y'3 of the guide opening 231 and a face 219 perpendicular to the axis Y4-Y'4.

Figure 6:
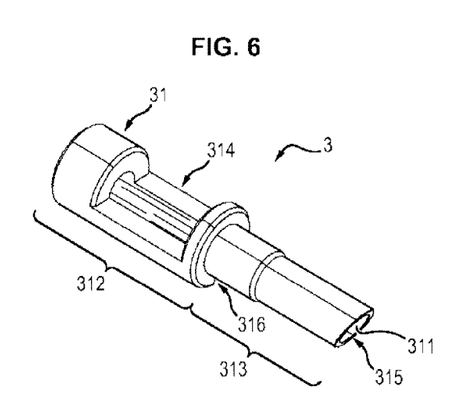
FIG. 6 is a perspective view of the body of said syringe.

One exemplary embodiment of the syringe 3 for introducing the restrictors R will now be described in connection with FIGS. 6 to 8.

This syringe 3 comprises a body 31, a push-piece 32 and a slide 33.

The body 31 is cylindrical and has a central bore 311 which passes through it from side to side. The inner diameter of this bore 311 corresponds, within the sliding clearance, to the outer diameter of the restrictors R.

The body 31 comprises a rear portion 312 and a front portion 313. The rear portion 312 has an outer diameter greater than that of the front portion 313 and also greater than that of the guide opening 231, so that this rear portion 312 abuts against the guide plate 23, when the syringe is inserted into this opening, as can be seen in FIGS. 5 and 8.

The front portion 313 has for its part a diameter corresponding, within the sliding clearance, to the inner diameter of the guide opening 231.

The rear portion 312 is equipped with a window 314 which corresponds to the removal of a hemicylindrical portion of the body 31 over a portion of the length of the rear portion 312. This window leads to the bore 311 and allows the introduction of the restrictors R.

Preferably, the front end 315 of the body 31 has a curved section which adopts the shape of the exterior cylindrical face of the bearing P. Finally, the rear portion 312 advantageously has a port 316 in the vicinity of the zone of intersection with the front portion 313, this port 316 being designed to receive the telltale spur 232.

Figure 7:
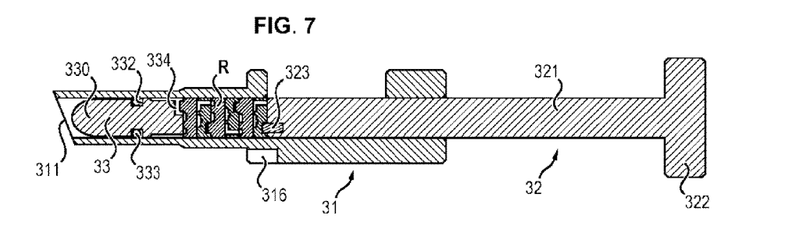
FIG. 7 is a longitudinal section view of the syringe for introducing the restrictors, containing the latter.

As can be seen in FIG. 7, the push-piece 32 comprises a cylindrical stem 321 of which the outer diameter corresponds, within the sliding clearance, to the inner diameter of the bore 311, so as to be able to slide inside the latter, and also comprises a head 322, of greater diameter, on which is it possible to exert a thrust (see arrow F in FIG. 8) to insert the restrictors into the bearing P.

Advantageously, the free end of the stem 321 is equipped with a finger 323 configured to be able to be received in a cavity C of the last restrictor R of the restrictor stack. This finger 323 allows the prevention of axial rotation of the restrictors R.

The slide 33 is a cylindrical part, the outer diameter of which corresponds, within the sliding clearance, to the inner diameter of the bore 311 and of the standby system CS. This slide 33 has for example a front end 330, preferably with a rounded shape. It comprises an annular groove 332 on its external perimeter, designed to receive an O-ring 333. Finally, preferably, the rear end of the slide 33 has a cavity 334 designed to cooperate with the male element E of the first restrictor of the stack. The cooperation of this cavity 334 with the restrictor situated above allows the prevention of the rotation on itself of the slide 33.

Figure 8:
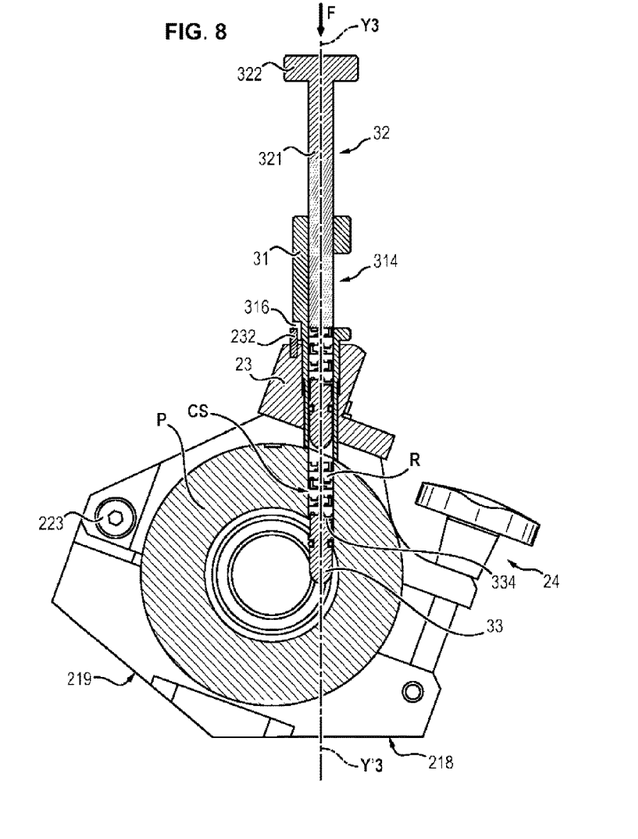
FIG. 8 is a transverse section view of the frame and of the syringe conforming to the invention.

Once the different restrictors R are stacked on one another and introduced into the bore 311, through the window 314, the push-piece 32 can be actuated to move from an original position shown in the upper portion of FIG. 8 toward an introduction position shown in the lower portion of the same FIG. 8.

The O-ring 333 of the slide 33 allows a force to be generated on the walls of the standby system and to limit the sliding of the slide, which thus allows the retention of the restrictors R.

The restrictor R stack and slide 33 assembly is lowered into the standby system CS, using the push-piece 32, on which a press, not shown in the figures, exerts a pressure F. Advantageously, the frame 2 is caused to pivot, so that the face 218 or 219 perpendicular to the opening 231 in which the restrictors R are being inserted rests on a horizontal plane (see FIG. 8).

This operation is carried out by hoop reinforcing. To accomplish this, the bearing P is placed in an oven so that the standby system CS is dilated. It is then placed on the frame 2, and more precisely, in the exemplary embodiment described here, is placed on the cradle 21 held in position by the flanges 22, and it is only afterward that the restrictors R are inserted by force with the syringe 3.

Figure 9:
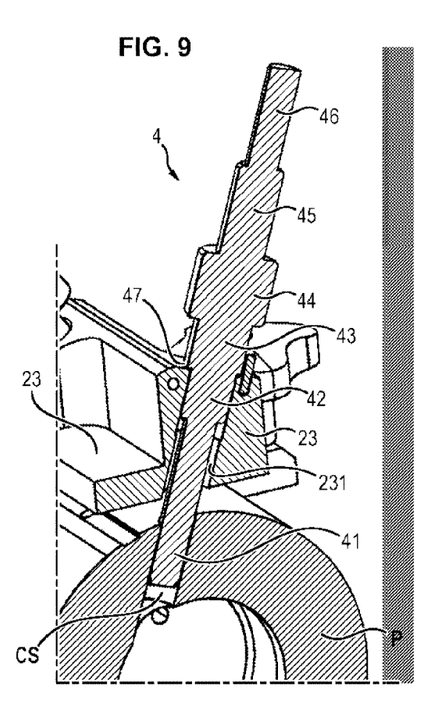
FIGS. 9 and 10 are perspective and partial section views of a portion of the frame, of the bearing and of the torque pickoff spindle, the latter being shown in two different operating positions.

The torque pickoff spindle 4 will now be described in connection with FIGS. 9 and 10.

This spindle is intended to be introduced into the first standby system CS, while the syringe 3 is introduced into the second standby system CS, so as to take up the torque generated on the bearing P during hoop reinforcement of the restrictors R and to prevent the rotation of the bearing around its longitudinal axis X-X'.

This spindle 4 also has the role of being introduced into the second standby system CS while the syringe 3 is inserted into the first standby system to introduce the restrictors there.

Figure 10:
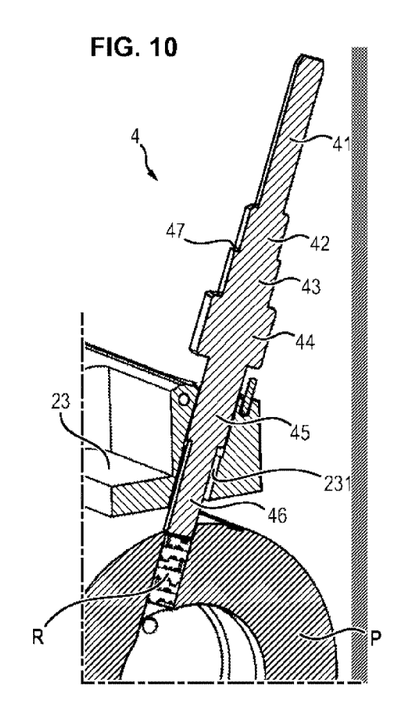

As appears more clearly in FIG. 10, the torque pickoff spindle 4 has a generally cylindrical shape with successive zones of increasing, then decreasing diameters. In FIG. 10 and from top to bottom of it, the six zones of the spindle have respectively the reference symbol 41, 42, 43, 44, 45 and 46. Zone 44 is the zone with the greatest outer diameter.

Zone 43 has a smaller outer diameter than that of zone 44 but greater than the inner diameter of the guide opening 231. Zone 42 has an outer diameter smaller than that of zone 43 and identical to that of the guide opening 231. An annular shoulder 47 extends between zones 42 and 43. Finally, zone 41 has an outer diameter smaller than that of zone 42, and identical or slightly smaller than that of the standby system CS of the bearing that it is desired to equip with restrictors. Zone 45 has the same outer diameter as zone 42 and zone 46 has the same outer diameter as zone 41.

When the bearing P is still not equipped with a restrictor R, the torque pickoff spindle 4 is inserted so that zone 41 penetrates into the empty standby system CS and the shoulder 47 abuts against the external face of the guide plate 23. This position is shown in FIG. 9. The length of zone 41 is suitable for penetrating to the interior of the standby system.

The restrictors R are inserted with the syringe into the other standby system. The slide 33 falls into the central cavity CC of the bearing. Subsequently, the syringe 3 is then removed and the spindle 4 is turned over so that its end (zone 46) is inserted into the upper end of the standby system CS until it abuts against the last restrictor R of the stack. Zone 46 is therefore shorter than zone 41. In this position, shown in FIG. 10, the spindle 4 plays the same role as previously and the syringe 3 can be used to hoop reinforce the stack of restrictors R in the other standby system.

It will be noted that this reversible spindle 4 can also be replaced by two different spindles, one comprising zones 41 to 44, the other zones 44 to 46.

The invention claimed is:

1. A hoop reinforcing device for restrictors inside at least two hydraulic supply standby systems of a journal bearing, comprising:
   a frame for receiving said journal bearing,
   a syringe for introducing restrictors and
   a torque pickoff spindle, and in that said frame comprises:
   a cradle,
   a guide plate perforated with at least two guide openings, inclined at the same angle as those of said standby systems of the bearing, so as to be located in the continuation of the latter when the bearing is in the frame, said guide openings being formed to receive said syringe or said torque pickoff spindle.

2. The device according to claim 1, wherein said frame comprises:
   a cradle for receiving said journal bearing,
   at least one flange for retaining said bearing, capable of occupying a position called "passive" in which said flange is separated from the cradle and allows the introduction of the bearing into the latter, and a position called "active" in which said flange cooperates with the cradle to immobilize said bearing in the cradle,
   means for locking said flange in the active position, and in that said guide plate is integral with said at least one flange.

3. The device according to claim 2, wherein said flange is pivotally mounted with respect to the cradle around a pivoting axis disposed at one of ends of said flange, and in that said flange has at its opposite end a means of cooperation with said means for locking the flange in the active position.

4. The device according to claim 3, wherein said locking means are a threaded rod pivotally mounted at its base with respect to the cradle and a nut, and in that the cooperation means provided on the flange are an opening for receiving the free end of said threaded rod.

5. The device according to claim 2, further comprising two flanges connected together by said guide plate.

6. The device according to claim 1, wherein the longitudinal axes of the guide openings are not crossing with the longitudinal axis of the frame.

7. The device according to claim 6, wherein the longitudinal axes of the guide openings extend in a vertical plane perpendicular to the longitudinal axis of the frame and form an identical angle on either side of a longitudinal vertical plane which includes the longitudinal axis of the frame.

8. The device according to claim 1, wherein the two guide openings are spaced longitudinally by a distance corresponding to that existing between the outlet openings of the standby systems at the outer surface of said journal bearing.

9. The device according to claim 1, wherein said syringe for introducing the restrictors comprises a syringe body perforated with a cylindrical bore for receiving said restrictors, a push piece configured to be able to be inserted into the body and push the restrictors out of the latter and a cylindrical slide of which the outer wall is provided with an O-ring, this slide being configured to be able to be inserted into the syringe body downstream of the restrictors and slow their movement in the syringe body.

10. The device according to claim 1, wherein said torque pickoff spindle is a cylinder comprising several stepped portions with different diameters, including at least one end zone of which the outer diameter corresponds, within the sliding clearance, to the inner diameter of the standby system of the bearing intended to be equipped with restrictors, an intermediate zone of which the outer diameter corresponds, within the sliding clearance, to the inner diameter of the guide opening and a zone contiguous with the preceding one of which the outer diameter is greater than the inner diameter of the guide opening.

11. A method for hoop reinforcing restrictors inside hydraulic supply standby systems of a journal bearing, comprising:

heating the journal bearing, introducing said journal bearing into the receiving frame of the hoop reinforcement device according to one of the preceding claims, orienting the bearing so that the outlet mouths of its standby systems are facing the guide openings of the guide plate, introducing the torque pickoff spindle into one of said guide openings, called the "first guide opening" and into the standby system situated facing said spindle, introducing the syringe containing the restrictors into the other guide opening, called the "second guide opening" and into the standby system situated facing said syringe, and acting on the syringe to hoop reinforce said restrictors inside said standby system, removing the syringe and the spindle from said guide openings, introducing the torque pickoff spindle into the second guide opening and into the upper portion of the standby system situated facing said spindle, introducing the syringe containing the restrictors into the first guide opening and into the standby system situated facing said syringe and acting on the syringe to hoop reinforce said restrictors inside said standby system, removing the syringe and the spindle from said guide openings.

* * * * *